May 12, 1936.   M. E. BRENDEL   2,040,073
WEIGHING APPARATUS
Filed Dec. 23, 1933   5 Sheets-Sheet 1

Inventor:
Max E. Brendel
By Roland C. Rehm
Atty.

May 12, 1936.  M. E. BRENDEL  2,040,073
WEIGHING APPARATUS
Filed Dec. 23, 1933   5 Sheets-Sheet 2

Inventor:
Max E. Brendel
By Roland C. Rehm
Atty.

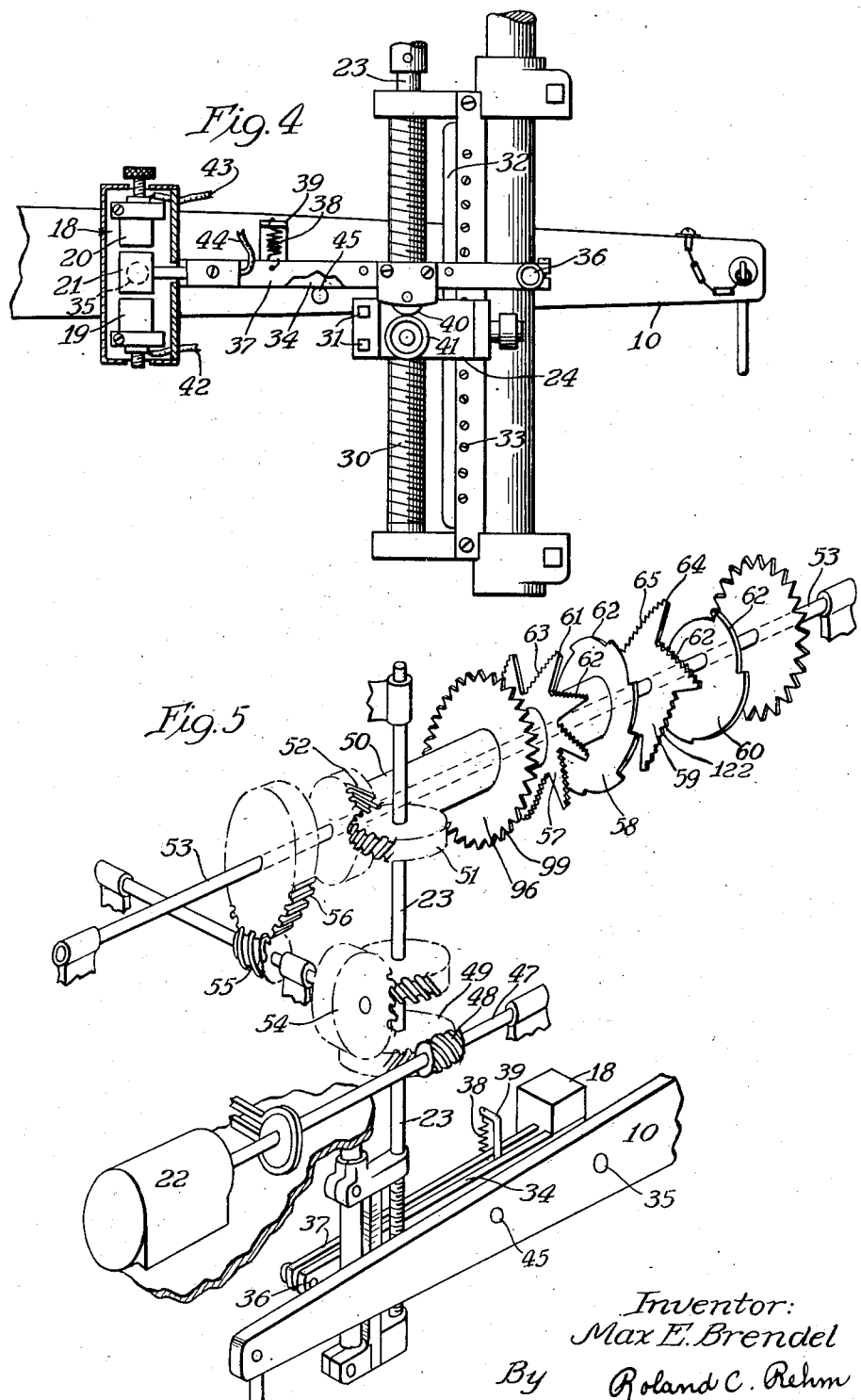

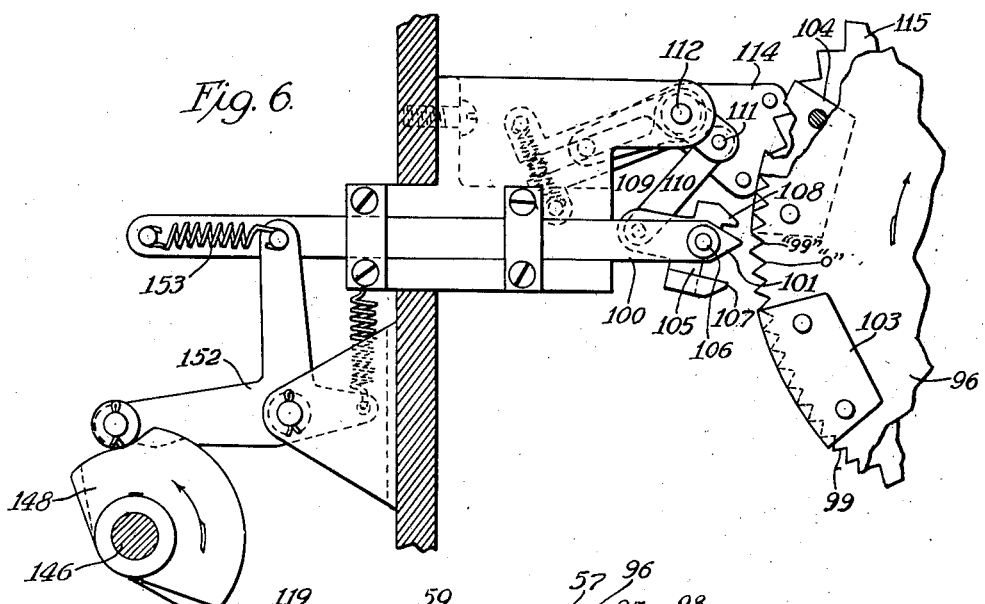
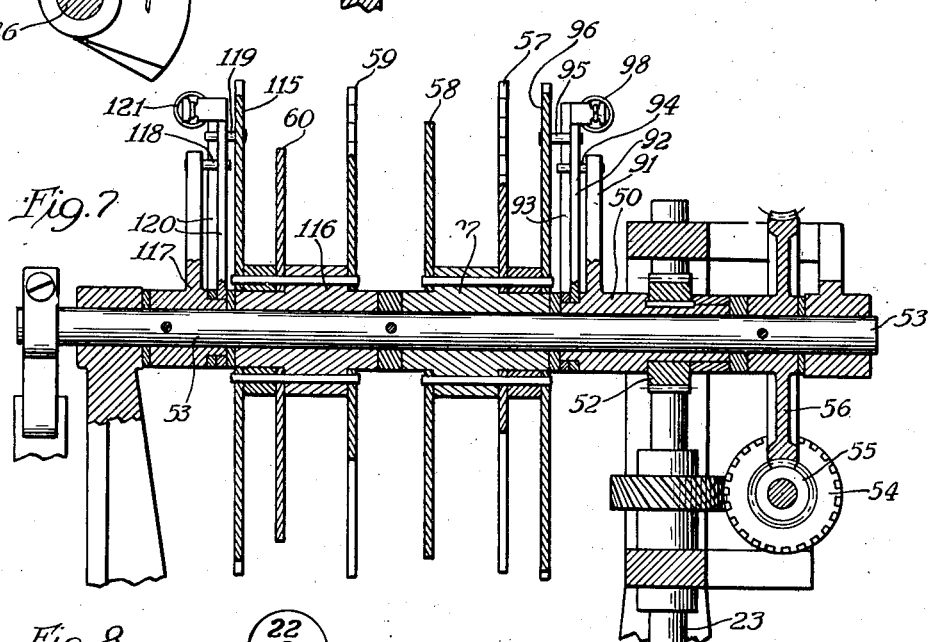
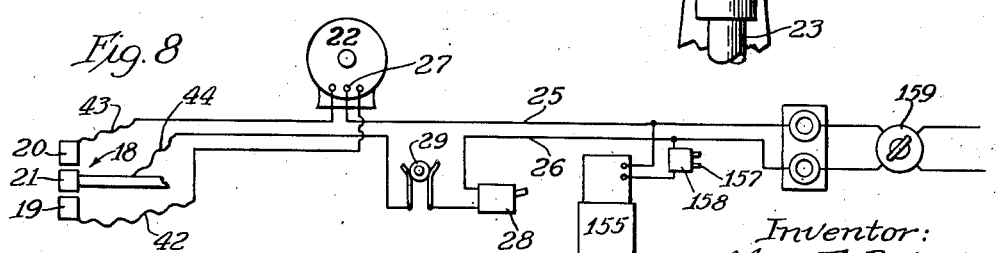

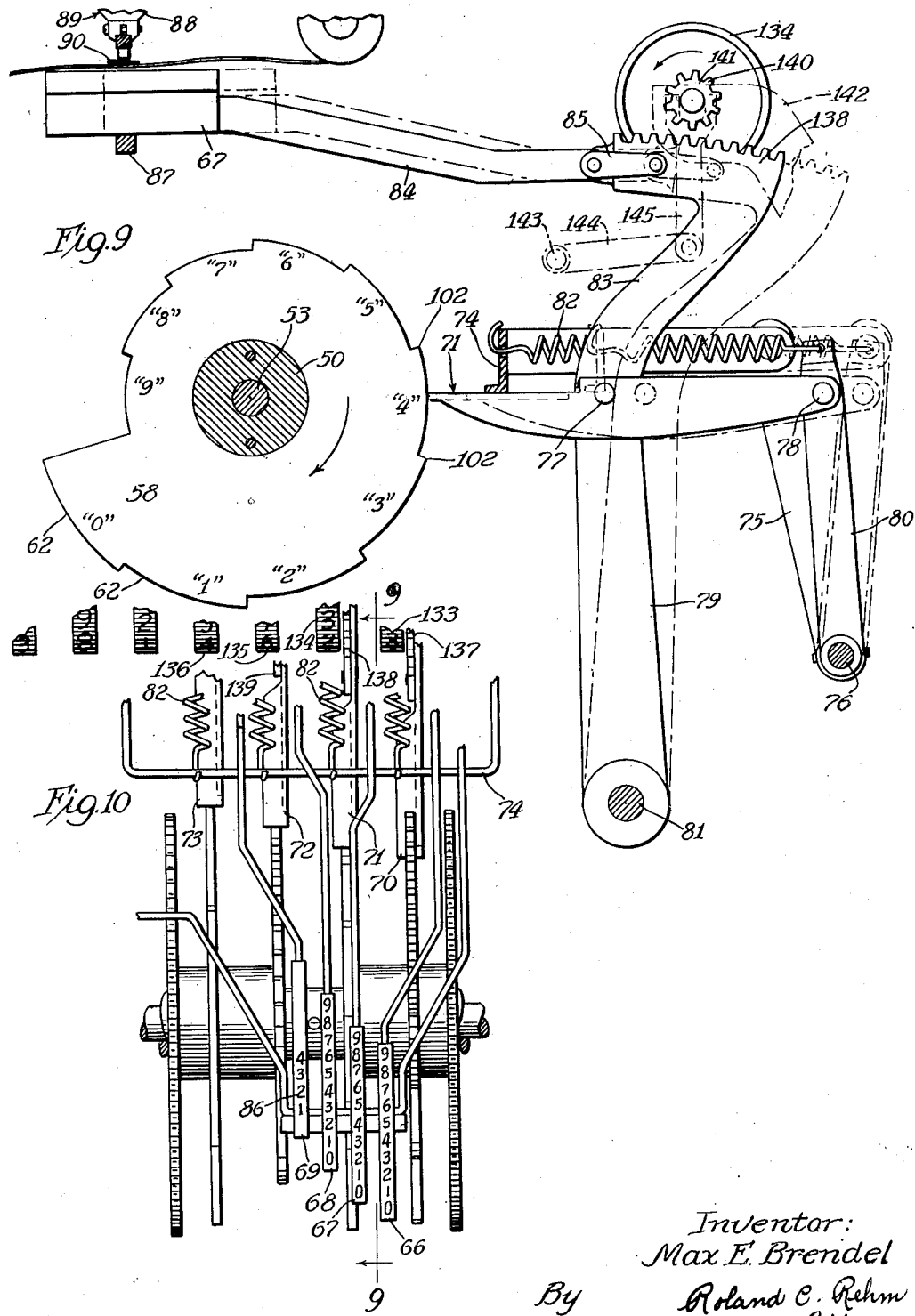

Patented May 12, 1936

2,040,073

UNITED STATES PATENT OFFICE 2,040,073

WEIGHING APPARATUS

Max E. Brendel, Chicago, Ill., assignor to Streeter-Amet Company, Chicago, Ill., a corporation of Illinois Application December 23, 1933, Serial No. 703,773

15 Claims. (Cl. 265—5)

This invention relates to weighing apparatus, and among other objects aims to improve the speed and accuracy with which a succession of weights may be made and totaled, and to simplify the mechanism by which this is accomplished.

The nature of the invention may be readily understood by reference to one illustrative apparatus embodying the invention and shown in the accompanying drawings.

In said drawings:

Fig. 4 is an elevation of the control apparatus which relieves the scale and scale beam of the burden of moving the totalizing apparatus;

Fig. 5 is a perspective view somewhat diagrammatic in character showing the train of mechanism controlled by the device shown in Fig. 4;

Fig. 6 is a side elevation taken approximately on the plane 6—6 of Fig. 2 of other details of the mechanism for adjusting the recording apparatus to avoid error at certain critical points;

Fig. 7 is a longitudinal sectional elevation through a portion of the recording apparatus taken on the plane 7—7 of Fig. 2;

Fig. 8 is a diagrammatic view of one electric circuit by which the apparatus is controlled;

Fig. 9 is an enlarged sectional elevation of a detail of the recording and totalizing apparatus taken approximately on the plane 9—9 of Figs. 2 and 10; and Fig. 10 is an enlarged plan view of certain details of the totalizing and type bar actuating mechanism comprising approximately the central portion of Fig. 2.

Weighing apparatus of the recording or totalizing type which have imposed on the scale mechanism itself the burden of operating a substantial part or all of the recording mechanism, have not been successful. Even where friction of the mechanism so operated has been minimized and the parts perfectly balanced, yet the inertia of the moving parts seriously impairs and definitely limits the speed of the weighing operation.

In the illustrative weighing apparatus the scale mechanism itself is not burdened with any registering, recording or totalizing apparatus, the latter being operated by an independent source of power, and may therefore come to a quick balance unencumbered by the inertia of such apparatus. Greater accuracy as well as simplification of mechanism and reduction of cost is secured by setting the indicating, recording or totalizing mechanism by devices here represented by step cams which have both a greatly increased range of movement and a larger movement per unit of weight.

Figure 1:
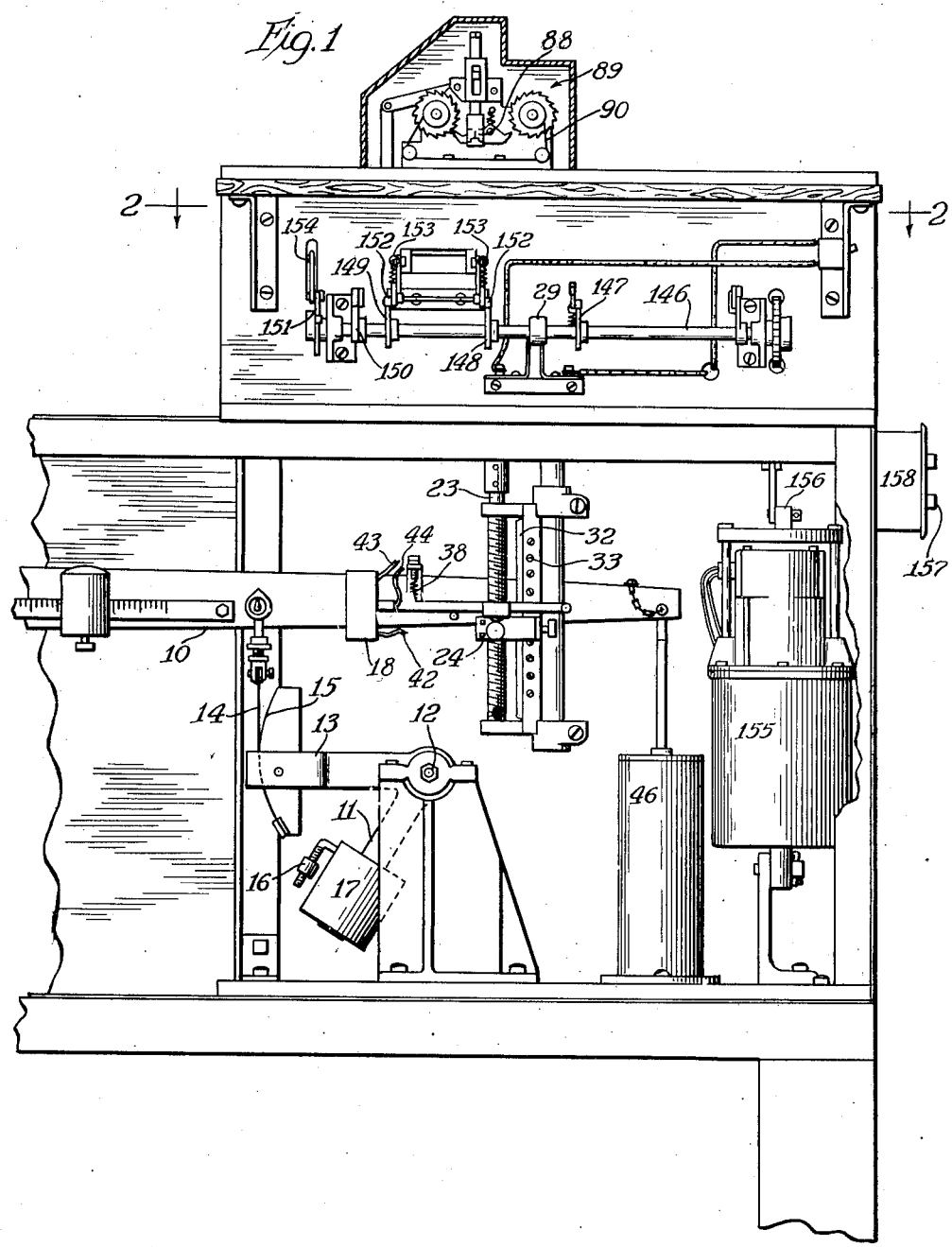
Fig. 1 is an elevation of the apparatus, excluding portions of the scale structure itself.

To simplify the drawings, conventional details of the scale mechanism itself, such as the scale platform, pivots, levers, etc., have been omitted. Such mechanism terminates in an indicating element here represented by a conventional beam 10. The beam is here shown counterbalanced by a pendulum 11 pivoted at 12 and carrying a lever arm 13 connected by a flexible metal ribbon 14 to the scale beam. An arc-shaped extremity 15 which the ribbon 14 engages gives the lever arm 13 a constant length or any other characteristic which may be desired. A small adjustable weight 16 associated with the main pendulum weight 17 may assist in calibrating the scale. As indicated in Fig. 1, the scale beam and associated mechanism is counterbalanced in zero position when the pendulum weight 17 is substantially removed from a position below its pivot. This materially increases the speed with which the scale beam returns to zero. The pendulum 11 therefore counterbalances the indicating element (here scale beam) throughout its operative arc of travel which in the present instance is about five inches; thus every position of the indicating element represents a definite weight.

This characteristic is employed to control the movement of but not itself to actuate, the recording and totalizing mechanism. The aforesaid independent power mechanism is, as here shown (Figs. 1 and 4), controlled by a small lightweight, substantially counterbalanced actuator operated by scale beam 10 and with which is associated an electric circuit which provides the power for operating the recording and totalizing mechanism responsively to and substantially synchronously with the free movements of the indicating element or scale beam. The details of the actuator are substantially the same as those disclosed in my co-pending application Serial No. 632,351 and will here be briefly described.

Figure 2:
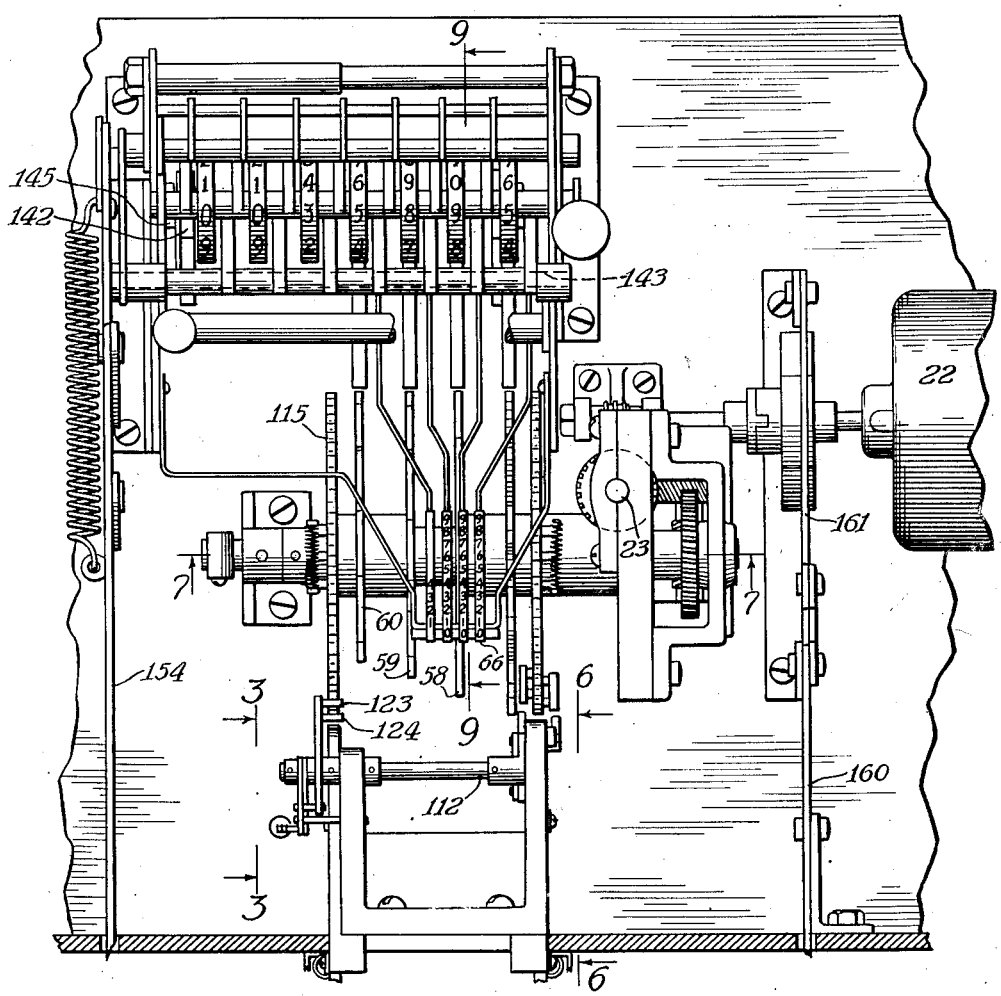
Fig. 2 is a plan view taken on the plane 2—2 of Fig. 1 of the recording and totalizing mechanism.

As here shown, the scale beam 10 carries an electric reversing switch 18 pivotally mounted thereon and comprising a pair of contacts 19 and 20 preferably comprising carbon blocks each presenting a face of substantial area (in this case about one square inch) to minimize the effects of sparking, and a movable intermediate contact element 21 (also having carbon block contact faces) which is controlled by the scale beam and engages one or the other contacts 19 or 20 in controlling the movements of the recording mechanism in response to the movements of the scale beam. When the beam has come to balance and the recording mechanism has been moved to a corresponding position, the movable contact member then assumes an intermediate position (as shown in Fig. 4) out of contact with both of the contacts 19 and 20, at which time the recording mechanism is also at rest. The aforesaid reversing switch actuates a reversible electric motor 22 (Figs. 2, 5, and 8) which by means of an appropriate driving train (presently described) rotates the screw shaft 23 on which travels the actuator or follower 24 whose movements are made to respond to the movements of the scale beam and whose position on the screw shaft represents a definite weight. The motor may advantageously be of a type having two oppositely wound fields, one field being connected with contact 19 and the other with contact 20 (see Fig. 8). Thus a reversal of the motor (accomplished by reversing the current in the field relative to the armature) is effected solely by establishing a circuit by means of the movable contact 21 through contacts 19 or 20 (as the case may be) without any intervening mechanism. The controlling circuits are illustrated diagrammatically in Fig. 8 wherein electric current is supplied through wires 25 and 26 which lead respectively to the common terminal 27 of the motor and the movable contact 21. A switch 28 is interposed in the circuit so that if desired the current may be thrown off the motor 22.

The operative travel of the follower 24 on screw shaft 23 is approximately that of the range of movement of the scale beam (in this instance about five inches). The shaft is here shown provided with a thread 30 having a pitch of ten threads to the inch. In the present case the follower 24 is in the form of a split nut which operates upon the threads 30. Headed screws 31 serve to tighten the nut so as to eliminate free play or lost motion. The nut is held against rotation as it travels up and down by a guide strip 32 along which the follower travels. As explained in the aforesaid Brendel application, a series of screws 33 are arranged to engage the strip 32 at a plurality of points along its length whereby the same may be warped slightly to effect appropriate calibration of the apparatus.

Movable contact 21 is actuated by a series of multiplying levers whose movement is controlled by the scale beam. Such levers in this instance comprise a main lever 34 pivotally mounted at 35 (Fig. 4) on the scale beam itself. In the present instance the pivot 35 is that of the switch structure 18, since the latter and main lever 34 are rigidly connected together. Pivoted at 36 adjacent the other end of the main lever is switch lever 37 which carries at its other extremity the movable contact 21. The slight weight of lever 37 is counterbalanced by spring 38 suspended from a bracket 39 carried on the main lever 34. Near its pivot, lever 37 carries a roller 40 adapted to engage with roller 41 on follower 24.

The contacts 19 and 20 are of course electrically insulated from each other in the scale beam and leading therefrom are readily flexible wires 42 and 43 comprising a part of the circuit illustrated in Fig. 8. Movable contact 21 is likewise connected to the same circuits by a wire 44. The aforesaid wires are sufficiently slack to allow free movement of the scale beam.

Pin 45 carried by the scale beam is provided to engage main lever 34 when the various parts occupy a predetermined position as presently explained.

While the operation of the aforesaid controlling apparatus is more fully described in my co-pending application, a brief description of such operation will suffice for present purposes: When the follower 24 lies below its proper weight position as regards that of the scale beam, contact 21 is permitted to fall and engage contact 19, closing that motor circuit which rotates the motor in a direction to raise the follower 24. If the movement of the follower be so prolonged as to carry it above its corresponding position relative to the scale beam, the other motor circuit is closed by engagement of contact 21 with contact 20, reversing the motor and moving the follower down. Such operation ensues because whenever the follower is below the position corresponding to that of the scale beam, the pin 45 engages main lever 34, raising it from its neutral position and causing lever 37 to fall by gravity under the weight of its roller 40 (which is not entirely counterbalanced by spring 38) to bring contacts 19 and 21 together. The ensuing upward movement of the follower 24 eventually brings its roller 41 into engagement with roller 40 and raises lever 37 about its pivot 36, breaking the circuit between contacts 19 and 21. If the movement of the follower is not brought to rest before contact 21 closes the circuit with contact 20, the follower 24 is moved down. Successive reversals of the motor continue until the follower is brought into a position corresponding to the position of the scale beam at which time both roller 41 and pin 45 will be in contact with their respective levers and the movable contact 21 will be in neutral position as shown in Fig. 4.

It should be understood that the gap between the stationary and movable contacts (Fig. 4) is exaggerated for purposes of illustration, the aggregate actual gap in the present instance advantageously being about one thirty-second of an inch, i. e., one sixty-fourth of an inch on each side of contact 21 when the latter is in neutral position. The close proximity of the contacts coupled with the multiplication of movement effected by the positioning of roller 40 so close to pivot 36, causes the contacts 19, 20, and 21 to be engaged and separated upon very minute vertical relative movements of the scale beam or follower 24, which in the present instance may be as little as one one-thousandth (1/1000) of an inch.

The response of the motor to the control mechanism is so prompt that in the use of the apparatus very little "hunting" occurs in establishing a position of "balance" for follower 24 corresponding to the position of the scale beam. Moreover the rotation of the motor and driving screw 23 is sufficiently rapid to cause the follower 24 to travel up and down substantially with and at the speed of the scale beam itself, it being understood that sudden movements of the latter are prevented by an appropriate dash-pot 46. The avoidance of substantial lag between the movement of the scale beam and that of the follower 24 effectively avoids repeated reversals of movement of the follower in arriving at a "balanced" position.

It is apparent therefore that the movement of the mechanism driven by the motor corresponds with and is made responsive to the movements of the scale beam; and that every position of the scale beam requires a predetermined travel of the motor. In other words, the motor rotates its shaft and those geared with it a predetermined number of times (from the zero point) for each position of the scale beam. The position of the motor shaft for a given scale beam position is, of course, the same whether or not either the motor or scale beam started from zero. In the present instance, the screw shaft 23 is connected through a train of gears with the recording mechanism which is therefore moved in response to the movements of the scale beam. The driving train involving the motor screw shaft and associated mechanism is illustrated diagrammatically in Fig. 5. As there shown, the motor shaft 47 drives the screw shaft through a worm and helical gear 48 and 49 whose ratio is such as to effect a substantial speed reduction from motor to screw shaft.

The aforesaid definite relation between scale beam position and motor shaft position is utilized to record and indicate the weight on the scale represented by a given scale beam position. The counting mechanism by which the rotation of the motor shaft is recorded is here represented by a plurality of step cams driven by shaft 23 which serve as a means for setting the counting and recording apparatus. The independent source of power may thus advantageously be employed to give the step cams a much greater range of movement and each increment of movement may also be made great enough to secure greater accuracy and eliminate many mechanical problems. The movement and design of the step cams may vary with the capacity of the scale and the relative rates at which the step cams are driven by motor 22. In the present instance, the capacity of the scale is five thousand units, that is, one which records variations in weight of one five-thousandth of the capacity of the scale. For example, if the scale have a capacity of five thousand pounds, it will record variations of one pound in weight; if it have a capacity of fifty thousand pounds, variations of ten pounds in weight.

To simplify the coordinating mechanism as well as to secure greater accuracy in the operation of the recording mechanism, certain of the step cams have an operative range of more than a single revolution. Among other advantages, this simplifies the design and manufacture of the step cams and their operating mechanism, as becomes apparent by comparison with an arrangement where the maximum travel of all the step cams is a single revolution or less. If for example the "tens" step cam rotates at a ratio of one hundred to one relative to the "hundreds" step cam, it is possible to secure a range of ten thousand units without requiring relative rotation between the "hundreds" and "thousands" step cams. In other words, the latter step cams may be mounted together on one shaft and rotate together. Moreover, the design of the "hundreds" step cam will be relatively simple.

In the illustrative apparatus a range of five thousand units may conveniently be secured by rotating the "units" and "tens" step cams at fifty times the speed of the "hundreds" and "thousands" step cams. This is effected in the present instance by providing a pair of concentric shafts, one rotating at one-fiftieth the speed of the other. The fast shaft 50 is tubular in form and is driven from screw shaft 23 through helical gears 51 and 52. Slow shaft 53 passes through the bore of tubular shaft 50 and is driven by a train of helical reduction gears and worm gears 54, 55, and 56 from the helical gear on shaft 23. The latter gears are so designed as to secure a speed ratio of one to fifty relative to the speed of rotation of shaft 50. The slow shaft 53 therefore may be employed to control recording of the "hundreds" and "thousands" digits of the weight and the fast shaft 50 may be employed to control the "units" and "tens" digits of the weight. The number of steps on the various step cams of course depends upon their rotation ratio.

It is convenient in the present instance to employ separate step cams 57 and 58 for the "units" and "tens" digits respectively although they rotate at the same rate and are both fixed in proper position relative to each other on shaft 50. Likewise it is convenient to control the "hundreds" and "thousands" digits by step cams 59 and 60 respectively although they also are fixed in proper relative position to shaft 53 and rotate at the same speed. With this arrangement the "units" step cam 57 has ten sets 61 of steps 63, the respective steps of each set corresponding to the successive "units" from "0" to "9" and each set 61 corresponding to successive "tens" digits from "0" to "9". The "tens" step cam 58 (see Fig. 9) is provided with a series of ten steps for successive "tens" digits from "0" to "9" and corresponding in angular separation to the successive sets 61 on cam 57. The face of each step 62 of the step cam is in the form of an arc whose center is the center of rotation of the step cam. The faces or steps have uniform angular separation and each preferably is offset from the adjacent step by a uniform amount. In the "units" and "hundreds" step cams this applies to the steps in each set. They are positioned in sequence from "0" to "9". Each of the aforesaid steps corresponds to a set of steps 61 of the "units" step cam. It will be understood of course that the corresponding small steps 63 in each of the sets of steps on the "units" cam 57 is the same distance from the center of rotation of the step cam. The faces of the small steps are made wide enough to avoid mechanical error, this being made possible by increasing the range of movement of the step cams. For example, for each one hundred pounds of weight the present "units" step cam is given one complete revolution and need provide only one hundred steps although the full range of the scale is five thousand pounds in increments of one pound. The five thousand units are therefore distributed over a plurality of revolutions in the present case, fifty revolutions of the "units" step cam.

Since the capacity of the mechanism is only five thousand units, the "thousands" step cam 60 is provided with only five steps and the "hundreds" cam 59 is therefore provided with five identical sets 64 of ten small steps 65, each small step representing a "hundreds" digit from "0" to "9".

The recording apparatus is here shown in the form of type bars 66, 67, 68, and 69 representing respectively the "units", "tens", "hundreds" and "thousands" digits and controlled respectively by the step cams 57, 58, 59, and 60. The respective type rest bars are set in a position corresponding to the setting of the step cams (when a record is to be made) by means of step cam contacting elements in the form of fingers 70, 71, 72, and 73 respectively located opposite the respective step cams and advanced into contact therewith by appropriate advancing and retracting mechanism. As shown particularly in Fig. 9, such mechanism comprises a transversely extending pulling member 74 in the form of a yoke oscillated back and forth by rock arms 75 fixed to rock shaft 76 adjacent its extremities. The fingers are here shown pivoted at 77 and 78 respectively to pairs of rock arms 79 and 80 by which they are supported for movement in a substantially longitudinal direction. Rock arms 79 swing on shaft 81 and arms 80 are loosely mounted on rock shaft 76 intermediate arms 75. The respective fingers are connected to the operating yoke 74 by means of springs 82 attached respectively to the yoke and to the respective rock arms 80. The yoke is given a travel equal to or slightly exceeding the maximum travel which may be required of a finger as when the "9" step on a given cam is opposite the finger; but the intervening springs 82 permit the movement of the fingers to be arrested when they separately engage their respective step cams without interfering with the continued advance of the yoke 74 or any of the other flanges.

As here shown, the arms 79 are provided with extensions 83 to which the respective type bar arms 84 are connected by links 85 which permit exact parallel or longitudinal movement of the respective type bars notwithstanding the swinging or circular movement of the arm extensions 83.

It will be understood that the offsets of the successive steps on the various step cams are sufficient to accommodate adequately large type figures 86 on the type bars and that such type figures are spaced and positioned on the type bars in definite relation to the corresponding steps on the respective step cams. In this connection also, the rotation of the "lower" step cams more than a single revolution is advantageous since, by reducing the number of steps per cam, each step can be made deep enough to secure adequate type bar movement without multiplying levers or the like.

As here shown, the type occurs on the upper face of the type bars and the latter slide back and forth upon a support 87 which serves also to resist the blow of the printing hammer 88. Any appropriate printing mechanism 89 (Figs. 1 and 9) may be employed, such for example as that shown in my co-pending application Serial No. 640,224. The details of the printing mechanism form no part of this invention and need not therefore be described, it being sufficient to note that in the present instance a ribbon 90 travels across the type bars at the printing position and serves to supply the ink for making an appropriate record on cards, tape or both, which are inserted under the printing hammer. The printing hammer should of course be designed to engage only one line of type at the printing position. In this connection it will be noted that the type on the respective type bars is always exactly in alignment with the printing position and never occupies an intermediate position regardless of the weight on the scale, the position of the type being always determined by the various steps on the step cams which insure an alignment of figures on the respective type bars in printing position.

Because of the larger number of small steps on the "units" step cam 57, the latter is advantageously temporarily adjusted just before a record is taken i. e., before the fingers 70 et seq. are advanced) so that the latter will strike squarely in the center of the proper step. Such adjustment in the present instance is effected by temporarily slightly rotating the step cam relative to its driving shaft 50 on which it is adjustably mounted. For such purpose, as shown particularly in Figs. 6 and 7, step cam 57, as well as its companion step cam 58, is mounted loosely on shaft 53 and driven by an arm 91 mounted on shaft 50 through a resilient connection with the latter. Such resilient connection comprises a pair of arms 92 and 93 loosely mounted on shaft 50 and embracing between them a pin 94 projecting from arm 91 and a pin 95 projecting from a toothed disk 96 connected to the sleeve 97 on which step cams 57 and 58 are mounted. A helical spring 98 draws arms 92 and 93 together and tends to align pins 94 and 95 (which brings the step cams into normal driving position relative to shaft 50). However, the resilient connection does permit a slight limited rotation of the step cams relative to shaft 50 by stretching spring 98 when pin 95 is moved out of radial alignment with pin 94. The cam notches 99 in disk 96 correspond with the separate steps 63 on the step cam 57, there being one hundred notches in the step cam and such notches are so located relative to the steps that when disk 96 is brought into adjusted position, a given step 63 on step cam 57 will be automatically aligned or centrally located relative to the finger 70. Such adjusted location is effected in the present instance by a reciprocating arm 100 having a cam-shaped end 101 (corresponding to the V-shape of the notches 99), which, just before a record is taken, is advanced into contact with disk 96 and by cam action brings the closest notch 99 into exact alignment with the position of arm 100 by rotating disk 96 under the yielding restraint of spring 98. The step cam is thereby rotated until the proper step is located centrally relative to the path of travel of its finger 70. The amount of movement (as determined by the position of the notch within the range of cam 101) is of course less than one step, and therefore does not produce any error in the recorded weight. The adjustment is such that the nearest unit, i. e. the step nearest alignment with finger 70 will be placed in recording position. There is no opportunity therefore for the finger 70 to strike (and possibly slide off the corner) between one step 63 and the rest; it always strikes the center of the step. Upon release by cam 100, spring 98 restores the step cam to normal position. The spring is sufficiently strong to maintain normal position of the step cam except when it is positively displaced by cam 101.

The step cam 58 having a fixed relation with step cam 57 is moved correspondingly on adjustment of step cam 57 by an amount sufficient to move the corner 102 of a step out of alignment with finger 71. Such adjustment is however superfluous in the present case except for the "9" and "0" or critical positions of the "units" step cam which locates a corner 102 formed by the offsets in step cam 58 closely opposite finger 71, thus creating the possibility that finger 71 may slip off the corner onto the next lower step when it should strike the higher step, or vice versa. In the latter instances, the adjustment of step cam 58 with step cam 57 carries the corner 102 safely out of alignment with finger 71.

After making a record, the arm 100 is withdrawn to allow the disk 96 with its associate step cams to resume normal position under the action of spring 98.

The possibility of error at critical positions of the "hundreds" and "thousands" step cams 59 and 60 is avoided by effecting a similar adjustment thereof whereby the cams are rotated beyond any critical point.

Figure 3:
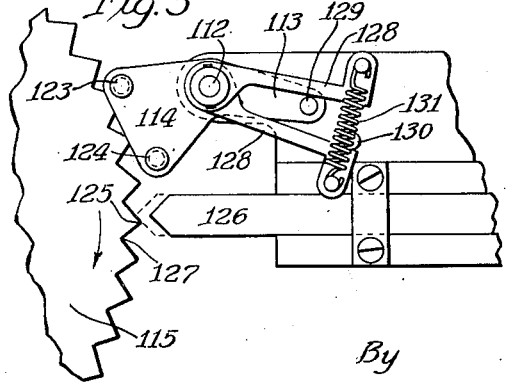
Fig. 3 is a side elevation taken approximately on the plane 3—3 of Fig. 2 of a detail of the device for adjusting the recording apparatus to avoid error at certain critical points.

The aforesaid adjusting mechanism is shown particularly in Figs. 3, 6, and 7, and is similar to mechanism accompanying an analogous function in my co-pending application Serial No. 632,351.

As here shown, disk 96 carries adjacent the critical position between "99" and "0" a pair of a pair of cam members or stops 103, 104 located on opposite sides of such critical position (see Fig. 6). The reciprocating arm 100 carries an oscillating cam 105 pivoted thereto at 106 and carrying a pair of spacer cam fingers 107, 108 separated a distance which is slightly less than the separation of the cam stops 103 and 104. In the present instance, the stops 103 and 104 are on opposite sides of disk 96 and the fingers 107 and 108 are correspondingly offset so as to be in alignment with the path of travel of the respective stops.

One or the other of stops 103 or 104 is engaged by cam 105 within a range of about eight notches on either side of the critical ("99"—"0") position. If arm 100, when advanced to engage the disk, engages either the "0" notch or others adjacent thereto on the same side of the "99" notch, finger 107 will engage cam 103 but finger 108 will clear cam 104. The resulting rotation of cam 105 is therefore clockwise. Conversely, if the point 101 on the arm enters the "99" notch or a notch adjacent thereto and on the same side of the "0" notch, cam finger 108 will engage the cam stop 104 causing the cam 105 to rotate in a counter-clockwise direction (Fig. 6). In such position the stop 103 lies beyond the path of cam finger 108 whose movement is therefore unobstructed. Connected with the arm 109 of the cam member is a link 110 which oscillates arm 111 connected to rock shaft 112 (see Fig. 3). The latter carries at its opposite end an arm 113 which is adapted to oscillate a cam member 114 for adjusting the "hundreds" and "thousands" step cams 59 and 60. Mechanism for accomplishing this operation is shown in Figs. 2, 3, 6, and 7. As there shown, a toothed disk 115 similar to disk 96 but having only fifty notches (since the "hundreds' step cam 59 has only fifty steps) is fixed to sleeve 116 on which step cams 59 and 60 are mounted. The sleeve is free on shaft 53 and is driven by means similar to that employed for driving disk 96 and its step cams. Such device comprises an arm 117 fixed to shaft 53 and provided with a pin 118 which drives the pin 119 on disk 115 through the agency of a pair of free arms 120 rotatable with the disk and arm but resiliently drawn together by spring 121.

Whenever the "tens" disk 58 approaches a critical position, i. e. between the "90" and "100" (i. e. "0") step, the "hundreds" step cam 59 is in a critical position, namely, where the shoulder or offset 122 between two of its steps lies substantially in the path of the finger 72 and may accidentally and improperly slip off the shoulder or may strike the shoulder when it should not. The mechanism above described is provided to turn step cam 59 (and also 60) in one direction or the other to carry each critical shoulder 122 between two steps safely out of alignment with finger 72 so that the latter will unerringly engage the proper step. This is effected in the present case by providing the cam member 114 with a pair of projecting cam teeth 123, 124 adapted selectively to engage the toothed disk 115 and rotate it to carry the step shoulder 122 in the proper direction beyond the critical position. As shown in Fig. 3, the cam 114 is being oscillated in a counter-clockwise direction and the pin 123 has engaged a tooth on the disk and is rotating the same in a clockwise direction so as to carry a critical tooth apex 125 in the proper direction beyond exact alignment with the positioning arm or finger 126 which is advanced a short interval after the advance of the other finger 100, thereby insuring the entry of finger 126 on the proper side of apex 125. The above operation ensues when the disk 96 associated with the "tens" disk cam occupies the position shown in Fig. 6. When the situation is reversed, i. e., when the finger 100 is entering the "0" notch or an adjacent notch on the same side of the "99" notch on disk 96, the cam 114 (Fig. 3) is given a slight clockwise rotation resulting in a counter-clockwise rotation of disk 115 thereby carrying the critical apex 125 on the opposite side of finger 126 to insure the latter's entry into notch 127. The positioning finger 126 having been started in the proper notch serves, by the cam action exerted against the face of a tooth, to rotate the disk 115 in a clockwise or counter-clockwise direction as the case may be against the tension of spring 121 thereby carrying the critical shoulder on the "hundreds" step cam 59 safely out of alignment with finger 72. When finger 126 is withdrawn, the disk 59 assumes its normal position under the action of spring 121.

Likewise on the withdrawal of finger 100, cam 114 is released and is moved into a neutral position by arms 128 which embrace a pin 129 on rock arm 113 and a fixed pin 130 on the supporting structure. A spring 131 tends to draw the arms together but permits them to be separated under the action of pin 129 in rotating cam 114. In the normal or released position, pin 129 is in radial alignment with pin 130 (with reference to the pivot 112 of cam member 114), thus moving cam pins 123 and 124 to a neutral position where they will both be clear of the teeth of disk 115, allowing it to rotate freely.

The aforesaid adjusting action of the "hundreds" cam takes place throughout a range of about eight teeth on each side of the "99"—"0" tooth of disk 96, the stops 103 and 104 each spanning this number of teeth. Beyond these teeth the particular critical apex on disk 115 has been normally carried sufficiently out of alignment with arm 126 as to make it impossible for the latter to pass on the wrong side of apex 125. Hence no safety adjustment is needed.

The "thousands" step cam 60, having in this case a fixed relation to the "hundreds" step cam 59, is moved correspondingly on adjustment of the latter by an amount sufficient to carry a shoulder between steps out of alignment (in the proper direction) with finger 73. Such adjustment is however superfluous except for the critical positions of the "thousands" step cam which occur between each of the sets of steps 64 on the "hundreds" step cam 59.

In the present apparatus, mechanism is advantageously provided by which a succession of weights may be totalized. The totalizing mechanism comprises a conventional totalizer represented by a series of counting wheels 133, 134, 135, 136 etc., the number of accumulating wheels over four depending upon the desired total capacity of the counting or totalizing mechanism. At least four counting wheels are of course necessary since the weight may be recorded in four figures. The details of the mechanism for transferring the count from the "units" wheel to the "tens" and from the "tens" to the "hundreds" etc. are of standard character and form no part of the invention. Any appropriate transfer or carrying mechanism may be employed. The totalizer is advantageously of the type wherein the counting or totalizer wheels are rotated on the return movement of the actuating racks under spring tension, the forward movement of the racks to the set position not being operative to rotate the wheels.

A given weight is set up in the counting mechanism in the present instance by associating with the various step cam fingers 70, 71, et seq. corresponding curved racks 137, 138, 139, et seq. (one for each finger) which are adapted to rotate the respective "units", "tens", "hundreds", and "thousands" counting wheels. The counting wheels are each rotated by means of a pinion 140 adapted to mesh with the corresponding curved racks 137, 138, et seq. and to rotate the counting wheels a distance corresponding to the position of the step fingers 70, 71, et seq. In the present case this rotation occurs upon the rearward or reverse travel of the finger when the yoke 74 is released. Since each of the fingers travel to a fixed starting point, the distance of return travel depends upon which step of its step cam was engaged by the setting finger. To avoid rotating the counting wheels in a reverse direction in advance of the finger, the shaft 141, on which counting wheels and their pinions are supported, is raised out of its supporting brackets 142 until the pinions are out of mesh with the respective curved racks.

The totalizer shaft 141 is raised and lowered by conventional mechanism represented by rock shaft 143, rock arm 144 fixed thereto and link 145 operatively engaging shaft 141. Following the printing operation which occurs at the termination of the forward movement of the type bars, the pinion supporting shaft 141 is dropped and the pinions mesh with the respective curved racks; and a count or record is thus made of the setting of the respective step cams which is accumulated in the counting or totalizing mechanism and indicated by the numerals on the counting wheels in the usual way. Since the fingers and therefore the curved racks 137, 138 advance definite increments, represented by the steps on the step cams (and assume no intermediate position), the pinions 140 will always freely mesh with the teeth in the curved rack. The pitch separation of such teeth should either equal the depth of a step on the step cam or bear a definite ratio thereto. In the present instance the ratio of pitch separation of the rack teeth to the depth of the steps on the step cams is that of the length of the rack lever arm to the arm 79. It will be apparent therefore that in the illustrative apparatus the depth of the steps on the step cams (which are uniform), the type separation on the type bars 67, and the pitch separation of the rack teeth all bear a definite relation to each other and should be designed with reference to each other.

The recording and totalizing apparatus may be operated in any appropriate manner either automatically or manually. In the present instance the adjusting mechanism (see Figs. 3 and 6), the printing mechanism, and the totalizing mechanism are all operated in proper sequence by cams on operating shaft 146. This shaft carries motor switch element 29, cam 147 for operating the motor brake, cam 148 for advancing finger 100, cam 149 for advancing finger 126, cam 150 for operating the printing mechanism 89, and cam 151 for actuating the counting or totalizing mechanism. Preferably the motor switch is opened when the scale mechanism has come to balance or after the lapse of a sufficient length of time (about three seconds) for the scale to have reached a position of balance or equilibrium. After the breaking of the motor circuit, subsequent disturbance of the scale mechanism, by vibration, removal of the load or otherwise, is not communicated to the recording mechanism.

As indicated in Figs. 1 and 6, the cam actuated rock arms 152 are connected with the fingers 100 and 126 through springs 153 which serve to protect the mechanism. Cam 151 is operatively connected to the totalizing mechanism by conventional mechanism represented by lever 154 which operates in different portions of its cycle both the shafts 76 and 143. A lever 160 operatively connects motor brake 161 with cam 147. The shaft 146 is rotated by any appropriate mechanism. In the present instance it is operated by a device 155 known on the market as a thrustor which is electrically actuated and serves to raise and lower a plunger head 156 which through link mechanism and a chain and sprocket rotate the shaft 146. The thrustor in the present instance is controlled by push button 157. It will be understood of course that the thrustor may be automatically actuated by the loads as they are about to leave the scale. For example; when a train of cars or a succession of loads is to be weighed and totalized, the movement of one load to a given position on the scale may actuate the thrustor or other appropriate mechanism for operating the recording and totalizing mechanism. As shown in Fig. 8, the thrustor 155 receives power from the same source as that which operates the motor 22. The switch 158 represents a manually or automatically operated switch which controls the operation of the thrustor. Switch 159 is of course a main line switch.

Obviously the invention is not limited to the details of the illustrative construction since these may be variously modified. Moreover, it is not indispensable that all features of the invention be used conjointly since various features may be used to advantage in different combinations and sub-combinations.

Having described my invention, I claim:

1. Weighing apparatus of the character described comprising in combination a weight responsive member constructed and arranged to be moved responsively to the load weighed to a position representing the weight of the load, mechanism for indicating the weight of a load on the weighing apparatus, a rotary step cam whose range of movement is a plurality of revolutions for setting the units digit of the indicating mechanism, said step cam having a series of steps whose number is only a fraction of the capacity of the weighing apparatus whereby the capacity of the weighing apparatus is the product of a number of steps on said cam and the number of revolutions of the cam in traversing the capacity of the weighing apparatus, means for rotating the step cam to a weight position corresponding to that of the load responsive member, and means for causing the step cam to set the units digit of said indicating mechanism.

2. Weighing apparatus of the character described comprising in combination a load responsive member movable by a load to a position representing the weight of the load, a plurality of rotatable step cams whose movement is controlled by said weight responsive member, there being one step cam for each of the digits in the number representing the weight of the load, said step cams being relatively rotatable to allow the units cam to have a greater degree of rotation than certain of the other step cams, and a registering device set by the step cams to register the weight of the load.

3. Weighing apparatus of the character described comprising in combination a weighing member movable in response to a load to be weighed to a position representing the weight of the load, a series of step cams corresponding to the digits in the weight of the load and movable to a position representing the weight of the load, devices adapted to engage and be set by said step cams to a position representing the weight of said load, and means controlled by a step cam of a lower order when in a critical position for temporarily shifting a step cam of a higher order to insure engagement of the proper step.

4. Weighing apparatus of the character described comprising in combination a weight responsive member constructed and arranged to be moved responsively to the load weighed to a position representing the weight of the load, weight recording mechanism, rotary step cams having a range of movement substantially greater than that of the weight responsive member for setting the recording mechanism, and independent power means controlled by said weight responsive member for rotating said step cams substantially simultaneously with the movement of said weight responsive member to a position corresponding to that of the weight responsive member.

5. Weighing apparatus of the character described comprising in combination a weight responsive member constructed and arranged to be moved responsively to the load weighed to a position representing the weight of the load, weight recording mechanism, rotary step cams for controlling the setting of the respective digits in the weight by the recording mechanism, means for rotating said step cams to positions corresponding to the position of said weight responsive member, and means for temporarily adjusting a step cam forward or back when in a critical position to avoid the possibility of an incorrect setting of said recording mechanism.

6. Weighing apparatus of the character described comprising in combination a weight actuated member constructed and arranged to be moved by a load to be weighed to a position corresponding to the weight of the load, a series of step cams, a weight indicator adapted to be set by the step cams, independent power means for driving the step cams, and a controlling device operated by the movements of the weight actuated member for controlling said power means to move the step cams responsively to the movement of the weight indicator.

7. Weighing apparatus of the character described comprising in combination a weighing member movable in response to a load to be weighed to a position representing the weight of the load, weight recording apparatus, step cams for setting the recording apparatus, and independent power means controlled by the weighing member for moving said step cams responsively to the movements of said weighing member.

8. Weighing apparatus of the character described comprising in combination a weight responsive member constructed and arranged to be moved responsively to the load weighed to a position representing the weight of the load, a plurality of weight exhibiting wheels having associated therewith a plurality of rack actuating fingers for operating the respective wheels, rotary step cams representing the several digits in the weight of a load, means controlled by the load responsive member for rotating said step cams substantially synchronously with the movement of said load responsive member to a position representing the weight of a load, and means for advancing said fingers into engagement with the set step cams for rotating said wheels.

9. Weighing apparatus of the character described comprising in combination a weight responsive member constructed and arranged to be moved responsively to the load weighed to a position representing the weight of the load, weight exhibiting means including a plurality of weight exhibiting wheels and having associated therewith a plurality of rack actuating fingers for operating the respective wheels, rotary step cams representing the several digits in the weight of a load, the units step cam constructed and arranged to rotate a plurality of times throughout the capacity range of the weighing apparatus and having a definite ratio of rotation with respect to other step cams, means for rotating the step cams to a position corresponding to that of the weight responsive member, and means for advancing said fingers into engagement with the set step cams to rotate said wheels.

10. Weighing apparatus of the character described comprising in combination a weight responsive member constructed and arranged to be moved responsively to the load weighed to a position representing the weight of the load, weight exhibiting means including a plurality of weight exhibiting wheels and having a plurality of rack actuating fingers for operating the respective wheels, rotary step cams representing the several digits in the weight of a load, means controlled by the load responsive member for rotating said step cams responsively with the movements of said weight responsive member to a position representing the weight of a load, and means for advancing said fingers into engagement with the set step cams for actuating said wheels.

11. Weighing apparatus of the character described comprising in combination a weight responsive member constructed and arranged to be moved responsively to the load weighed to a position representing the weight of the load, weight recording mechanism, rotary setting means for setting the recording mechanism, means actuated by said weight responsive member for rotating the setting means to a position corresponding to that of the weight responsive member, and means for multiplying the ratio of movement of said setting means relative to that of said weight responsive member to give said setting means a range of operative rotation substantially greater than a single revolution in traversing the capacity of the weighing apparatus.

12. Weighing apparatus of the character described comprising in combination a weighing member movable in response to a load to be weighed to a position representing the weight of the load, a series of step cams corresponding to the digits in the weight of the load, driving means separate from said weighing member but controlled thereby for supplying power to drive said cams to a position representing the weight of the load, a plurality of devices for exhibiting the digits in the weight of the load, a series of racks corresponding to each of the step cams for actuating said devices, and step cam engaging fingers associated with said racks and adapted to engage and be set by the steps on the respective step cams when said apparatus is in load balance position, said fingers adapted to set said racks and exhibiting devices in positions representing the weight of a load on said apparatus.

13. Weighing apparatus of the character described comprising in combination a weighing member movable in response to a load to be weighed to a position representing the weight of the load, a series of step cams corresponding to the digits in the weight of the load and rotatable to positions representing the weight of the load, weight exhibiting devices adapted to engage and be set by said step cams respectively to positions to exhibit the weight of said load, and means for relatively adjusting a device and its step cam before the engagement of the device with the step cam to cause the device to engage an intermediate portion of a step spaced from both the front and rear of said step to avoid the possibility of engagement with an improper adjacent step when the adjacent lower order digit is near a "zero" position.

14. Weighing apparatus of the character described comprising in combination weighing mechanism including a series of step cams corresponding collectively to digits in the weight of the load and movable to positions representing the weight of the load, a series of fingers adapted to be set by the respective step cams, weight exhibiting means controlled by said fingers for exhibiting the weight of the load, and means for relatively adjusting a finger to a step cam in one direction or the other to cause the finger to engage its step at a point sufficiently removed from both its front and rear limits to avoid the possibility of engagement of the finger with an improper adjacent step when the adjacent lower order digit is near a "zero" position.

15. Weighing apparatus of the character described comprising in combination weighing mechanism including a series of step cams corresponding collectively to digits in the weight of the load and movable to positions representing the weight of the load, a series of fingers adapted to be set by the respective step cams, weight exhibiting means controlled by said fingers for exhibiting the weight of the load, and means for relatively adjusting a finger to a step cam before engagement of the finger with the step cam to cause the finger to engage the step cam squarely at a point removed from the end of the step thereby to avoid the possibility of engagement with an improper adjacent step when the adjacent lower step cam is in a critical position.

MAX E. BRENDEL.